May 6, 1947.  J. E. KLINE  2,420,140
MEANS FOR MACHINING RECTANGULAR APERTURES
Filed Aug. 25, 1943  3 Sheets-Sheet 1
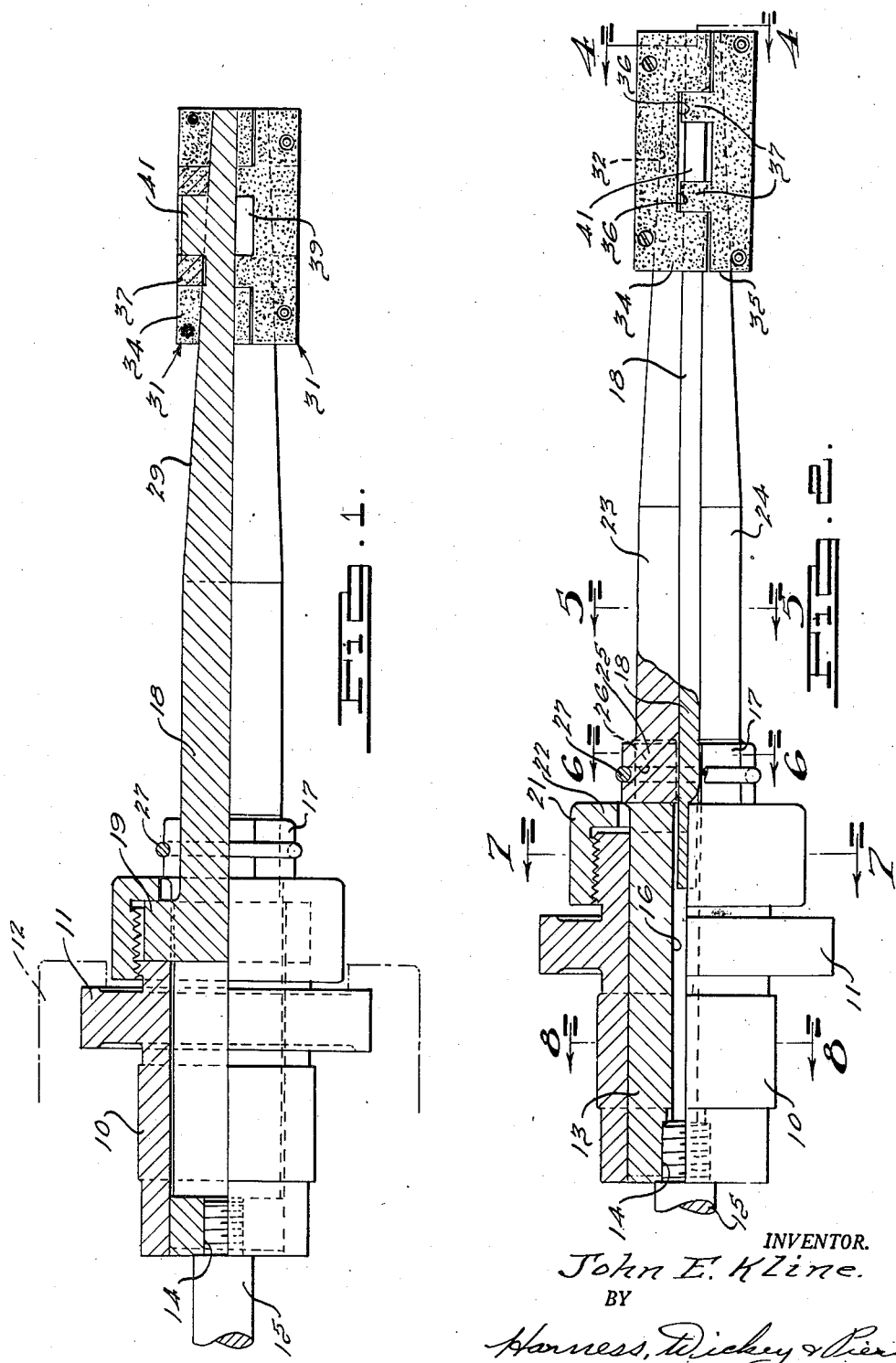
INVENTOR.
John E. Kline.
BY
Harness, Dickey & Pierce
ATTORNEYS.

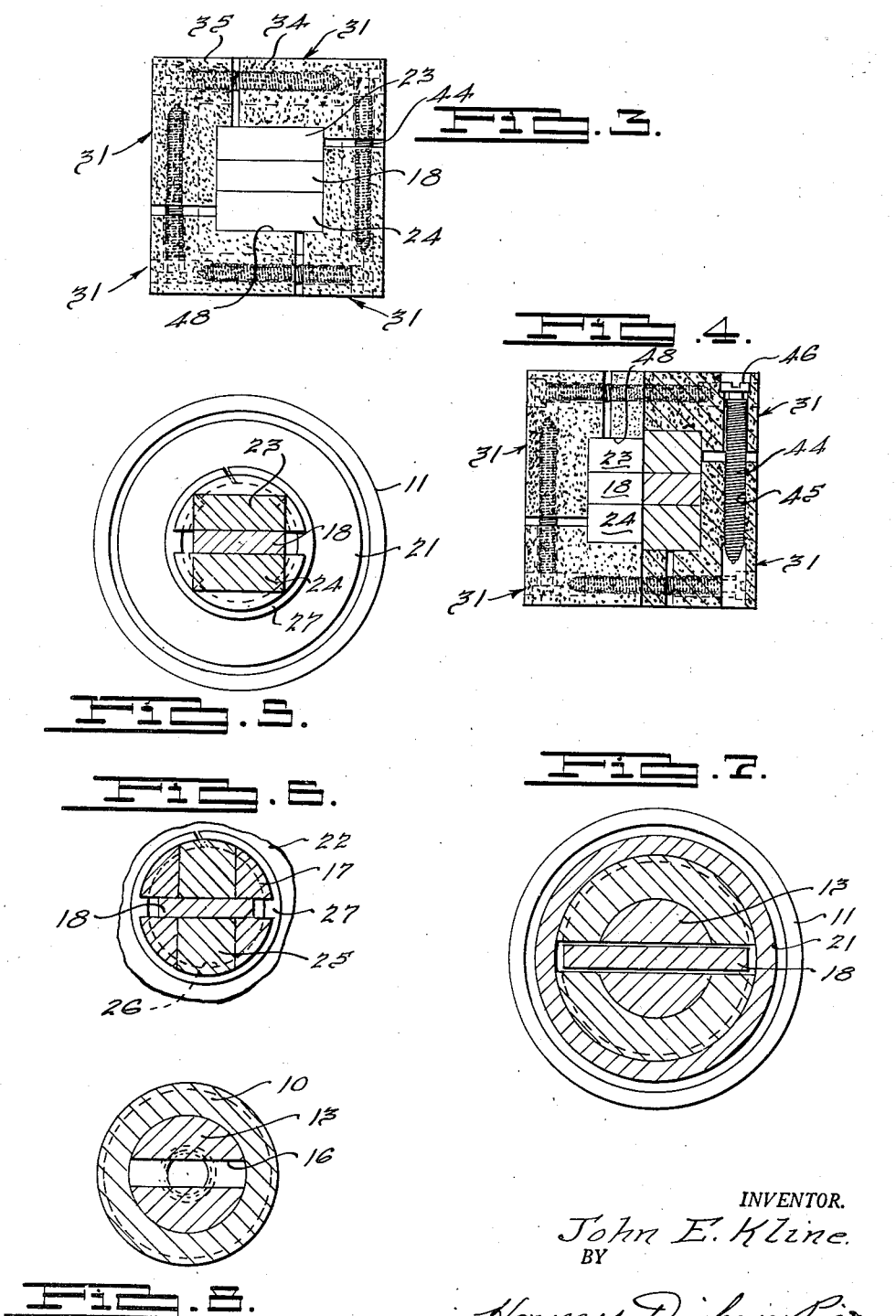

May 6, 1947.                J. E. KLINE                2,420,140
             MEANS FOR MACHINING RECTANGULAR APERTURES
             Filed Aug. 25, 1943        3 Sheets-Sheet 3
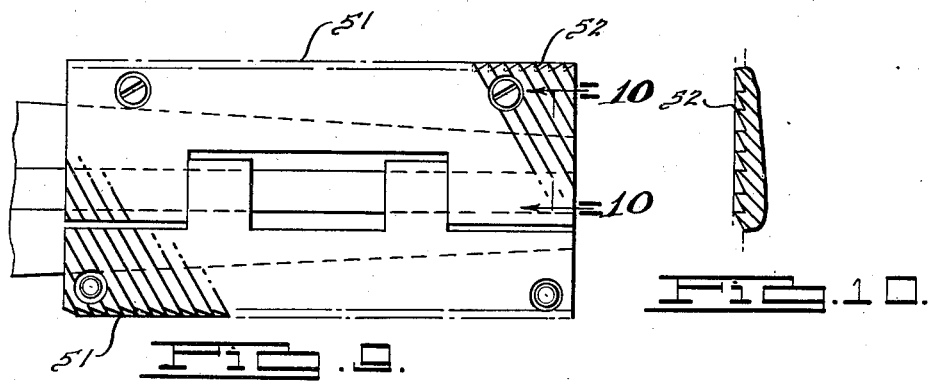
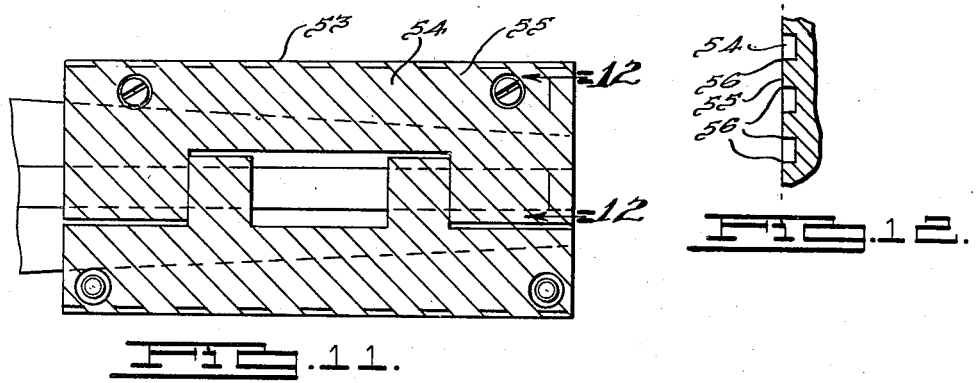
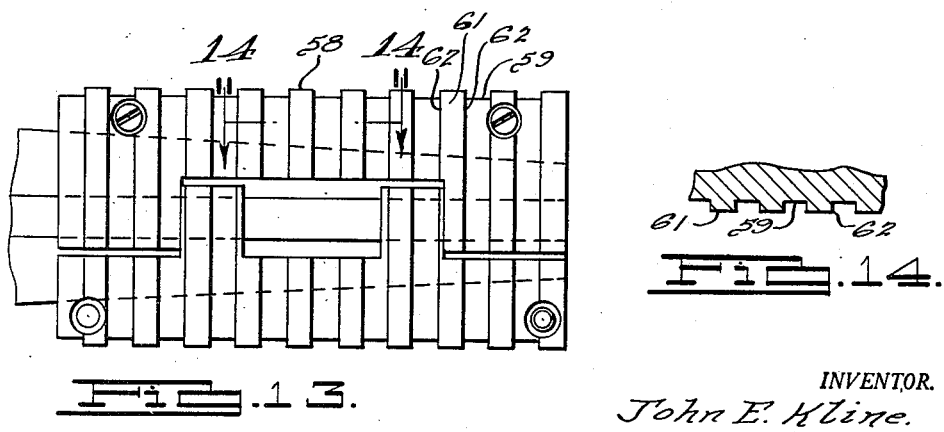
INVENTOR.
John E. Kline.
BY
Harness, Dickey & Pierce Patented May 6, 1947

2,420,140

UNITED STATES PATENT OFFICE 2,420,140

MEANS FOR MACHINING RECTANGULAR APERTURES

John E. Kline, Grosse Pointe Farms, Mich., assignor to Micromatic Hone Corporation, Detroit, Mich., a corporation of Michigan Application August 25, 1943, Serial No. 499,971

15 Claims. (Cl. 51—184.3)

1

This invention relates to honing tools and particularly to a tool for machining the surface of square or rectangular apertures to a predetermined accurate dimension.

Heretofore, honing has more or less been limited to the shaping and finishing of cylindrical objects by a tool body having the abrading surfaces of radially adjustable stones fall on the surface of a cylinder. A movement in rotation and reciprocation was applied to the tool body during the machining operation and the stones were adjusted radially outward until the abrading surfaces reached a diameter to which the cylinder was to be machined.

In practicing the present invention, a body is provided having four interlocking segments which form a square or rectangular shape when interconnected by resilient means for drawing the segments together. Adjusting means is provided for moving the corners of the segments radially outward to provide an expansion along all four sides of the tool. The tool is moved in reciprocation, which reciprocation may have a vibratory movement superimposed thereon to materially increase the cutting action between the surface of the segments and of the aperture.

After the aperture has been machined to size, the expanding mechanism is retracted to permit the springs to retract the cutting segments to a smaller area than that of the aperture so that the tool may be withdrawn therefrom without touching the finished surfaces. To facilitate the withdrawal without contact occurring between the segments and the finished bore surface, guide elements may be employed similar to those illustrated and described in the copending application to J. E. Kline, Serial No. 369,925, filed December 13, 1940, which matured as Patent No. 2,343,013, February 29, 1944.

The tool embodies a supporting and driving shank which is hollow and which is attachable to a reciprocating arbor of a machine such as shown in the copending application of J. E. Kline and D. T. Peden, Serial No. 274,890, filed May 22, 1939, which matured as Patent No. 2,363,975, November 28, 1944, and preferably equipped with a feed adjusting mechanism as shown in the copending application of D. T. Peden, Serial No. 365,526, filed November 13, 1940, which matured as Patent No. 2,350,527, June 6, 1944. As an alternative, a machine as illustrated in Patent No. 2,323,780, issued to J. E. Kline, may be used therewith. All of the applications and the patent above mentioned are assigned to the assignee of the present invention.

2

The driving shank supports a central segment supporting plate having wings by which it is secured to the shank. The body of the tool is made up of two rectangular portions which project into the shank and are supported on an adjusting rod. The ends of the body portion are tapered, and with the tapered sides of the plate form a rectangular or square tapered section. This tapered section mates with the tapered surfaces within the cutting segments which are moved radially outward along the corner medians of the segments when the body elements are moved relative to the plate. The latter prevents longitudinal movement of the cutting segments.

Accordingly, the main objects of this invention are: to provide a tool for machining bores of a shape other than cylindrical, having cutting segments which are adjustable to increase the effective size thereof; to provide a tool with four L-shaped cutting segments which interlock with each other and a supporting plate, and are adjustable radially outward at the corners; to provide a tool for machining square, rectangular, or opposed sided apertures of a shape other than cylindrical, by providing a supporting head having a plate which retains segmental cutting members in interlocked relation with each other against longitudinal movement and providing cam means which moves the segments outwardly for increasing the area of the tool body; and, in general, to provide a tool for accurately machining and finishing irregular apertures which is simple in construction, positive in operation, and economical of manufacture.

Other objects and features of novelty of this invention will be specifically pointed out or will become apparent when referring, for a better understanding of the invention, to the following description taken in conjunction with the accompanying drawings, wherein:

Figure 1 is a view of a tool for honing non-cylindrical bores, which embodies features of this invention;

Fig. 2 is a plan view, partly in section, of the structure illustrated in Fig. 1;

Fig. 3 is an enlarged end view of the structure illustrated in Fig. 1;

Fig. 4 is an enlarged sectional view of the structure illustrated in Fig. 2, taken on the line 4—4 thereof;

Fig. 5 is an enlarged sectional view of the structure illustrated in Fig. 2, taken on the line 5—5 thereof;

Fig. 6 is an enlarged sectional view of the structure illustrated in Fig. 2, taken on the line 6—6 thereof;

Fig. 7 is a sectional view of the structure illustrated in Fig. 2, taken on the line 7—7 thereof;

Fig. 8 is a sectional view of the structure illustrated in Fig. 2, taken on the line 8—8 thereof;

Fig. 9 is a broken view of structure, similar to that illustrated in Fig. 2, showing a modified form of the invention;

Fig. 10 is a sectional view of the structure illustrated in Fig. 9, taken on the line 10—10 thereof;

Fig. 11 is a view of structure, similar to that illustrated in Fig. 9, showing a further form which the invention may assume;

Fig. 12 is a sectional view of the structure illustrated in Fig. 11, taken on the line 12—12 thereof;

Fig. 13 is a view of structure, similar to that illustrated in Fig. 9, showing a still further form of the invention, and Fig. 14 is a sectional view of the structure illustrated in Fig. 13, taken on the line 14—14 thereof.

The tool embodies a driving shank 10 having an annular flange 11 by which the tool is supported in a reciprocating arbor 12 of a honing or other suitable machine. The driving shank is hollow and supports a cylinder element 13 having a threaded end 14 attached to an adjusting rod 15 and containing a central slot 16 which communicates with the threaded end portion. The opposite end of the cylindrical elements 13 from that containing the threaded portion is provided with arcuate segmental flanges 17 which project beyond the end of the driving shank 10. A connector plate 18 has its end adjacent to the driving head provided with opposed extending wings 19 which project within the slot 16 of the cylinder portion 13 of the shank. A flange nut 21 is screwed upon the end of the driving shank 10 with its inwardly projecting flange 22 engaging and clamping the wings 19 to support the plate 18 in extension of the driving shank.

A pair of rectangular camming elements 23 and 24, disposed on opposite sides of the plate 18, have arcuate segmental fingers 25 adapted to be received in the flange 17 at the end of the cylindrical elements 13. An annular groove 26 is provided in the flange 17 and fingers 25 in which a snap ring 27 is disposed for connecting the camming elements 23 and 24 in axially rigid extension of the cylinder element 13.

In the structure so far described, the nut 21 retains the supporting plate 18 in extended relation to shank 10 while the cylindrical element 13 and adjusting cam elements 23 and 24 may be collectively shifted relative to the shank and plate by the axial movement of the adjusting rod 15. The cam elements 23 and 24, along with the supporting plate 18, form a square section, as illustrated in Figs. 3, 4 and 5. It is to be understood that any rectangular section could be formed by the cam elements and plate to conform to the shape of the bore to be machined. Also, the cam elements and plate could be formed into a square as illustrated in the figures, and the segments themselves may be of different dimensions to form a rectangle or other figure.

From Figs. 1 and 2 it will be noted that one side and both edges of the cam elements 23 and 24 and both edges of the plate 18 taper at 29 uniformly to the end of the tool body to provide a truncated pyramidal section, which, when cam elements are moved relative to the abrasive segments (used in this instance), adjusts the segments radially.

Four L-shaped abrasive segments 31 are illustrated provided with inner tapered surfaces 32 which conform to the taper 29 on the cam elements 23 and 24 and the plate 18. One branch 34 of one section is aligned with a branch 35 of another segment. The branch 34 is provided with recesses 36 and the branch 35 has spaced projecting portions 37 which extend in the recesses 36. Extending wings 41 on the free end of the plate 18 project within the space 39 between the projections 37 on opposite branches 35. The wings 41 retain the segments 31 against longitudinal movement due to their engagement in recesses 39 in opposed segments and the interlock of the remaining segments with said opposing segments at 36 and 37.

Rat-tail coil springs 44 are employed for securing the segments 31 drawn against the cam surface 29 of the elements 23 and 24, as shown in Figs. 3 and 4. Each spring 44 is inserted through a clearance hole in an adjacent segment and threaded into an aperture 45 in an aligned segment, while the other end is retained in position by a headed screw 46 which threads within the opposite end of coil spring 44. The spring permits the expansion of the abrasive segments 31 outwardly of the corners of the tapered portion 29 and draws the segments inwardly when the cam elements 23 and 24 are moved toward the driving shank while the plate 18 retains the segments again longitudinal movement.

In view of the right angle relation of the tapered faces of the body portion of the tool, each segment will move radially outward of its corner. Because of the overlapping relation of the aligned branches of the segments, complete machining of the entire surface of the aperture will occur as the tool is reciprocated therewithin. It is to be understood that a rapid vibratory motion may be superimposed on the reciprocating movement to increase the abrading or cutting action of the segment.

While the tapered portion on the tool and the segments are herein illustrated as forming a square, it is to be understood that any regular sided figure may be honed in the same manner by changing the shape and/or the number of abrasive segments and the shape of the cam elements 23 and 24. It is also to be understood that, particularly in instances where the aperture is square, or nearly so, the segments may be identical to one another in all respects and still form the shape desired.

The inner faces 48 of the abrasive segments may have metal, plastic, or other substance applied thereto to prevent the abrasive particles from contacting the tapered surface 29 which would otherwise become abraded in time due to the relative movements of the cam elements 23 and 24 to the surfaces 29 of the segments.

In Figs. 9 to 14, machining segments composed of metal are illustrated as being employed in the place of the abrasive segments 31. The metal segments are of the same shape as the stone segments and are interfitted with each other and radially moved by the wedge of the tool to expanded positions in a similar manner. Cutting teeth are provided on the segments by which machining is performed by a shaving or a combination shaving and burnishing operation for finishing the surface of the non-circular bore.

In Figs. 9 and 10, segments 51 are similar to the abrasive segments 31 hereinabove referred to, with the exception that the segments 51 are made of metal and have cutting edges 52 on the faces which perform the machining operation. The cutting edges are herein illustrated as file-like teeth which are disposed at an angle to the axis of the tool. It is to be understood that the angle may be varied from that illustrated and that the cutting edge may be disposed normal to the tool axis.

When employing such a machine tool, the expanding pressure for moving the segments outwardly toward the surface to be machined is preferably applied at the end of the stroke just before the cutting stroke of the tool. This prevents unnecessary wear to the back edge of the teeth, which would occur if the segments 51 were permitted to expand before the return or up stroke of the tool. Whenever the tool is so small as to lack sufficient resistance to bending under the cutting load, the file teeth may be disposed so as to cut on the pull stroke only of the tool.

In Fig. 12, a similar machining head for a tool is illustrated—that having segments 53 which are similar to the segments 51 with the exception that slots 54 are cut in the faces of the segments leaving lands 55 therebetween. In this construction, the pressure may be maintained on the abrasive elements at all times during either direction of movement of the segments. This is made possible by the presence of the land surfaces 55 which engage the surfaces being machined and which produce some burnishing to the surface. The shaving edges 56 between the lands 55 and the wall of the slots 54 shave off the material which bulges into the slots when the lands are pressed into the metal. As the tool is reciprocated within the bore, shaving the edges 56 will remove metal from the walls while performing a burnishing operation thereon.

In Figs. 13 and 14, the segments 58 are similar to the segments 53. Slots 59 are provided on the faces of segments between which lands 61 are disposed. Cutting edges 62 are formed on each edge of the land where it joins with the wall of the slot. These cutting edges are capable of shaving metal from the wall of the bore as it reciprocates therein while pressure is applied between the land and the wall. It will be noted in this construction that the lands 61 and the slots 59 are disposed normal to the axis of the tool. This differs from the construction of Fig. 11, wherein the slots 54 and the lands 55 are disposed at an angle to the tool axis. It is to be understood that the invention is not limited to the particular angularity of the slots and lands illustrated, but that these may vary from the position illustrated in Fig. 13, in which the slots are normal to the tool axis, to an angular position which may be greater or less than that illustrated in Figs. 9 and 11.

The cutting teeth 52 illustrated in Figs. 9 and 10 produce cutting in a single direction of movement in the presence of a pressure which increases only before the cutting stroke of the tool. With the structure illustrated in Figs. 11 to 14, inclusive, the pressure may be maintained on the segments at all times and the machining operation performed by a combination shaving and burnishing action. The lands produce the burnishing of the surface, while preventing the cutting edges from moving too deeply into the surface so that only a slight amount of material is shaved from the surface during each cycle of operation of the tool.

What is claimed is:

1. A noncircular machine tool having a driving head, an adjusting head movable relative to said driving head, a central supporting plate carried by said driving head, cam elements disposed on opposite sides of said plate and carried by said adjusting head for movement longitudinally of said plate, and machining elements forming a continuous cutting surface about the entire perimeter of the tool supported against longitudinal movement by said plate in engagement with said cam elements which produces their lateral movement when adjusted in such manner as to retain the perimetrical form of the elements.

2. A noncircular machine tool having a driving head, an adjusting head movable relative to said driving head, a central supporting plate carried by said driving head, cam elements having a plurality of corners and a face disposed adjacent to said plate and carried by said adjusting head, machining segments supported against longitudinal movement by said plate in engagement with said cam elements, said segments being of L-shape and supported in interlocked relation with each other on the corners of said cam elements to be capable of machining on all parts of the perimeter of the tool, and means for moving said segments outwardly along lines substantially through the corners of the segments and those of the elements.

3. A noncircular machine tool having a fixed supporting plate, a plurality of cam elements resting against said plate, a plurality of interlocked machining segments each having angularly disposed machine faces forming a closed figure having a plurality of flat machine faces when assembled about said cam elements and plate, and means for securing said segments to said plate against movement along the tool axis.

4. A noncircular honing tool having a fixed stone supporting plate, a plurality of cam elements resting against said plate, a plurality of interlocked stone segments each having angularly disposed flat abrasive faces forming a closed figure having a plurality of flat machine faces when assembled about said cam elements and plate, means for securing said segments to said plate against movement along the tool axis, and means for adjusting said cam elements relative to the supporting plate to move said segments and uniformly expand said closed figure.

5. A tool for honing bores having angularly disposed faces, a fixed supporting element, rectangular cam elements disposed on opposite sides of said supporting element, abrasive segments having angularly disposed flat machine faces and offset interlocked edge portions secured to said supporting element and having sloping angularly disposed faces on the inner surface engaging the cam elements, and means for moving the cam elements relative to the supporting element for adjusting the segments outwardly along lines through the intersection of said faces and the corners of said cam elements.

6. In a tool for machining rectangular faces when reciprocated, a driving head, a supporting plate fixed to said head, cam means on each side of said plate forming therewith a rectangular section tapering towards the end, L-shaped machining segments having inner tapered surfaces supported about said tapered end, and spring means for holding said segments against said tapered end and supporting plate.

7. In a noncircular machine tool, a central longitudinally extending supporting plate, a plurality of cam elements engaging said plate, a plurality of machining segments supported on said plate with the abutted edges in interlocked relation forming a closed figure when assembled about said cam elements and plate having a plurality of flat machine faces, means securing said segments to said plate against movement along the tool axis, and means for relatively moving said cam elements and plate to move said segments outward of the tool axis while said flat machine faces retain the form of said closed figure.

8. In a noncircular machine tool, a central longitudinally extending supporting plate, a plurality of cam elements engaging said plate, a plurality of machining segments supported on said plate with the abutted edges in interlocked relation forming a closed figure when assembled about said cam elements and plate, each segment having a plurality of flat machining faces angularly disposed to each other, means securing said segments to said plate against movement along the tool axis, and means for relatively moving said cam elements and plate to move said segments outward of the tool axis, said segments being made of metal having file-like cutting edges on said flat machining faces.

9. In a noncircular machine tool, a central longitudinally extending supporting plate, a plurality of cam elements engaging said plate, a plurality of machining segments supported on said plate with the abutted edges in interlocked relation forming a closed figure when assembled about said cam elements and plate, each segment having a plurality of flat machining faces angularly disposed to each other, means securing said segments to said plate against movement along the tool axis, and means for relatively moving said cam elements and plate to move said segments outward of the tool axis while maintaining the shape of the figure formed by said flat machine faces, said segments being made of metal having spaced slots in its machining faces which provides lands therebetween.

10. In a noncircular machine tool, a central longitudinally extending supporting plate, a plurality of cam elements engaging said plate, a plurality of machining segments supported on said plate with the abutted edges in interlocked relation forming a closed figure when assembled about said cam elements and plate, each segment having a plurality of flat machining faces angularly disposed to each other, means securing said segments to said plate against movement along the tool axis, and means for relatively moving said cam elements and plate to move said segments outward of the tool axis while maintaining the shape of the figure formed by said flat machine faces, said segments being made of metal having spaced slots in its machining faces which provides lands therebetween which are disposed at an angle to the tool axis.

11. A tool for machining flat sided apertures, a tool body, machining segments supported by said body having flat engaging surfaces providing a form substantially that of the aperture, and means for expanding said segments while maintaining said form to machine said flat sides simultaneously as the tool is moved in reciprocation.

12. The combination in a honing tool for machining the surface of an element having a plurality of plane faces forming a figure noncircular in shape, of a plurality of machine elements each having a pair of plane faces disposed in angular relation to each other forming corners therebetween, a wedge in said tool having angularly disposed faces equal to the number of faces of said figure which form corners with each other, means for maintaining said elements on said wedge with a corner of each element engaging a corner of the wedge with the elements forming a figure the shape of said predetermined figure, and means for relatively moving said wedge and elements for changing the size of said figure formed by the elements while maintaining its shape.

13. The combination in a honing tool for machining the surface of an element having a plurality of plane faces forming a figure noncircular in shape, of a plurality of machine elements each having a pair of plane faces disposed in angular relation to each other forming corners therebetween, a wedge in said tool having angularly disposed faces equal to the number of faces of said figure which form corners with each other, means for maintaining said elements on said wedge with a corner of each element engaging a corner of the wedge with the elements forming a figure the shape of said predetermined figure, and means for relatively moving said wedge and elements for moving said elements along lines joining each corner of said wedge with the corner of the element in contact therewith.

14. A tool having an adjusting wedge means containing a plurality of faces forming angular corners therebetween, a plurality of machining sections each having a pair of work faces and a pair of wedge engaging faces disposed in parallel tilted relation to each other, means for supporting the wedge engaging faces in engagement with the faces forming the corners of said wedge means against longitudinal movement relative thereto, and means for shifting said wedge means relative to said sections to produce the lateral adjustment thereof outwardly of said corners.

15. A tool having an adjusting wedge means containing a plurality of faces forming angular corners therebetween, a plurality of machining sections each having a pair of work faces and a pair of wedge engaging faces disposed in parallel tilted relation to each other, means for supporting the wedge engaging faces in engagement with the faces forming the corners of said wedge means against longitudinal movement relative thereto, and means for shifting said wedge means relative to said sections to produce the lateral adjustment thereof outwardly of said corners, the abutting edges of the sections being disposed in overlapping relation providing a continuous machining surface in all positions of adjustment of said sections.

JOHN E. KLINE.

REFERENCES CITED

The following references are of record in the file of this patent:

UNITED STATES PATENTS

| Number | Name | Date |
| --- | --- | --- |
| 1,482,089 | Moore | Jan. 29, 1924 |
| 2,268,479 | Gjertsen | Dec. 30, 1941 |
| 2,313,442 | Kline | Mar. 9, 1943 |
| 2,175,158 | Nye | Oct. 3, 1939 |
| 1,392,426 | MacDonald | Oct. 4, 1921 |
| 1,397,660 | Rouze | Nov. 22, 1921 |
| 1,828,074 | Roebbel et al. | Oct. 20, 1931 |
| 1,886,836 | Reller et al. | Nov. 8, 1932 |
| 2,349,995 | Archer | May 30, 1944 |
| 1,922,202 | Hall et al. | Aug. 15, 1933 |